April 20, 1965  D. Q. FULLER  3,178,811
COLD WELDING ARRANGEMENTS
Filed March 20, 1961

Inventor
DENNIS Q. FULLER
By
Holcombe, Wetherill - Brisebois
Attorneys

United States Patent Office 3,178,811
Patented Apr. 20, 1965

3,178,811
COLD WELDING ARRANGEMENTS
Dennis Quintrell Fuller, Cambridge, England, assignor to Pye Limited, Cambridge, England, a British company
Filed Mar. 20, 1961, Ser. No. 97,057
Claims priority, application Great Britain, Mar. 29, 1960, 11,039/60
3 Claims. (Cl. 29—470.1)

The present invention relates to a method for cold welding a relatively thin metal part to a relatively thick metal part and more particularly for cold welding a relatively thin metal closure or cover member to a base member of substantial thickness.

Cold welding may advantageously be employed in the manufacture of transistors and other semiconductor devices of the heavy duty type which are mounted on a substantial base plate to which a thin protective metal cover is secured, since the securing of the cover by cold welding avoids the application of heat to the assembly, which may damage the semiconductor device. In order to obtain an effective cold welding of two parts, the metal of both parts must be allowed to flow freely and therefore it is necessary to reduce the cross section of the relatively thick member, such as a base plate in the region of the weld. It is an object of the present invention to provide a method whereby this may be achieved without excessively reducing the strength of the base plate or its ability to dissipate heat.

According to the present invention the relatively thick member, such as a base plate, is formed with a ridge to which the edge of the relatively thin member, such as the cover, is cold welded. For the welding of a generally cylindrical cover member to a base plate, an annular ridge is provided to which the rim of the cover is attached.

The ridge may be defined by two spaced grooves formed in the surface of the relatively thick member, so that the top of said ridge is in a plane with said surface. The grooves are preferably relatively shallow, that is they do not extend beyond half way through the thickness of the relatively thick member. The grooves may be formed by coining, turning, casting or any other appropriate means, then annealed.

Figure 1:
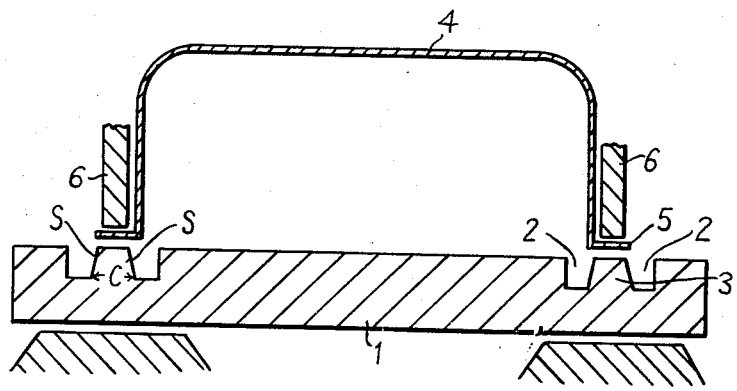
Figure 2:
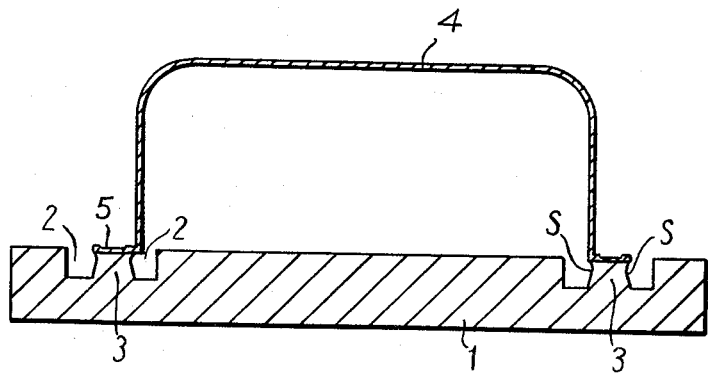

In order that the invention may be more fully understood reference will now be made to the accompanying drawings, in which:

FIGURE 1 is a somewhat diagrammatic view illustrating one arrangement according to this invention for cold welding a cover to a base plate, and FIGURE 2 is a similar view showing the cold welded joint as formed.

Referring to the drawings and more particularly FIGURE 1, a relatively thick base plate 1 is formed with two annular grooves 2 spaced apart to form a narrow annular ridge 3. A generally cylindrical cover 4 to be attached to the base is formed with a flange 5 at its lower edge which rests on the ridge 3. In order to carry out the cold welding operation, the cover is located in position by means of the punch 6. By adjusting the cross-section C of the ridge 3 and the surfaces of revolution contours S, it is possible to achieve substantially the same flow-pressure conditions as apply to the cold welding of two relatively thin sheets. FIGURE 2 shows the cold welded joint as formed.

By way of example, as applied to the manufacture of semiconductor devices, the base plate 1 on which the semiconductor device is mounted may have a thickness of between 0.05 and 0.1 inch and the metal cover may have a thickness of between 0.01 and 0.03 inch.

By the method according to the present invention it is possible effectively to cold weld a relatively thin metal cover to a relatively thick base plate without excessively reducing the mechanical strength of the assembly or greatly reducing the ability of the base plate to conduct heat away from a semiconductor device mounted thereon.

It will be apparent that the method according to this invention may be employed for other purposes besides the manufacture of semiconductor devices.

I claim:

1. In the art of cold welding a relatively thin metal member to a relatively thick metal member by the free flow of metal of both of said members, the step of forming two spaced grooves in the surface of the relatively thick metal member so as to define between them a ridge having its top surface in the plane of the surface of said relatively thick metal member, adjusting the shape and cross-section of the ridge so that substantially the same flow-pressure conditions are achieved during the cold welding operation as apply to the cold welding of two metal sheets of a comparable thickness to the relatively thin metal member, and cold welding a part of said latter member to the top surface of said ridge.

2. The method claimed in claim 1, wherein said two spaced grooves do not extend beyond half way through the thickness of the relatively thick member.

3. The method of cold welding a relatively thin generally cylindrical metal cover member having a peripheral flange to a relatively thick base member by the free flow of metal of both of said members, which consists in forming two spaced annular grooves in the surface of the base member so as to define between them an annular ridge having its upper surface in the plane of the surface of said base member, adjusting the shape and cross-section of the ridge so that substantially the same flow-pressure conditions are achieved during the cold welding operation as apply to the cold welding of two metal sheets of a comparable thickness to the flange of the relatively thin cover member, and cold welding the flange of said cover member to the upper surface of said ridge.

References Cited by the Examiner
UNITED STATES PATENTS

| | | | |
|---|---|---|---|
| 1,648,026 | 11/27 | Murray. | |
| 2,086,985 | 7/37 | Mitchell | 220—67 XR |
| 2,184,939 | 12/39 | Green | 220—67 XR |
| 2,932,684 | 4/60 | Hales | 29—470.1 XR |
| 2,941,688 | 6/60 | Chamberlin et al. | 220—2.3 |
| 2,975,928 | 3/61 | Roovers | 220—2.3 |
| 3,058,209 | 10/62 | Nijhuis | 29—482 XR |

THERON E. CONDON, Primary Examiner.
EARLE J. DRUMMOND, Examiner.